United States Patent
Sakai et al.

(10) Patent No.: US 6,734,595 B2
(45) Date of Patent: May 11, 2004

(54) ELECTRIC ROTATING MACHINE HAVING STRUCTURE OF SHIFTING STATOR POSITION BY PREDETERMINED ANGLE

(75) Inventors: Toshihiko Sakai, Yokohama (JP); Koichiro Ohara, Chiba (JP); Takuya Kawashima, Funabashi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/397,180

(22) Filed: Mar. 27, 2003

(65) Prior Publication Data

US 2003/0184183 A1 Oct. 2, 2003

Related U.S. Application Data

(63) Continuation of application No. 10/232,713, filed on Sep. 3, 2002, which is a continuation of application No. 10/038,618, filed on Jan. 8, 2002, now Pat. No. 6,452,304, which is a continuation of application No. 09/593,601, filed on Jun. 12, 2000, now Pat. No. 6,348,753.

(30) Foreign Application Priority Data

Oct. 25, 1999 (JP) .............................. 11-302786

(51) Int. Cl.[7] ................................. H02K 1/12
(52) U.S. Cl. ......................... 310/254; 310/89
(58) Field of Search .................... 310/254, 89, 191, 310/217, 43, 258, 209, 216, 218, 190, 91

(56) References Cited

U.S. PATENT DOCUMENTS

| | | |
|---|---|---|
| 4,910,475 A | 3/1990 | Lin |
| 5,006,744 A | 4/1991 | Archer et al. |
| 5,144,182 A | 9/1992 | Lemmer et al. |
| 5,223,761 A * | 6/1993 | Larsen .................. 310/259 |
| 5,932,942 A | 8/1999 | Patyk et al. |
| 5,969,447 A | 10/1999 | Periyathamby et al. |
| 6,018,207 A | 1/2000 | Saban |
| 6,348,753 B1 | 2/2002 | Sakai et al. |
| 6,404,086 B1 | 6/2002 | Fukasaku et al. |
| 6,452,304 B1 | 9/2002 | Sakai et al. |

FOREIGN PATENT DOCUMENTS

| | | |
|---|---|---|
| JP | 6-38465 | 2/1994 |
| JP | 7-59309 | 3/1995 |

\* cited by examiner

*Primary Examiner*—Thanh Lam
(74) *Attorney, Agent, or Firm*—Antonelli, Terry, Stout & Kraus, LLP

(57) ABSTRACT

An electric rotating machine having a stator including a stator core formed by accumulating and fixing a plurality of stator steel sheets, and stator coils mounted onto the stator core, a rotor having a rotation shaft received within an inner peripheral side of the stator, a molded resin frame for receiving the stator therein and a pair of end brackets for rotatably holding the rotation shaft of the rotor via bearings. A respective end bracket is fixed on opposite ends of the stator by through bolts inserted into through bolt holes formed therein, and each of the end brackets having a plurality of two kinds of bolt holes. Each of the stator steel sheets forming the stator core functions as a magnetic circuit, and corner portions thereof are formed with bolt holes in a semi-circular shape with an opening portion for receiving the through bolts.

4 Claims, 4 Drawing Sheets

ELECTRIC ROTATING MACHINE HAVING STRUCTURE OF SHIFTING STATOR POSITION BY PREDETERMINED ANGLE

CROSS REFERENCE TO RELATED APPLICATION

This is a continuation of U.S. application Ser. No. 10/232,713, filed Sep. 3, 2002, which is a continuation of U.S. application Ser. No. 10/038,618, filed Jan. 8, 2002, now U.S. Pat. No. 6,452,304, which is a continuation of U.S. application Ser. No. 09/593,601, filed Jun. 12, 2000, now U.S. Pat. No. 6,348,753, the subject matter of which is incorporated by reference herein.

BACKGROUND OF THE INVENTION

The present invention relates to an electric rotating machine, in particular to the electric rotating machine, in which improvements are made on stator iron or steel sheets and on positioning of penetrating or through bolt holes thereof, in a small-sized electric rotating machine.

An electric motor is known as an electric apparatus for converting electric energy into mechanical energy. In the electric motor, in which an electric system and a mechanic system are combined, there are used a relative motion between magnetic field and conductors and the electromagnetic force caused between the magnetic field and current, and an attraction and a repulsion between those magnetism. As one sort of such the electric motors, there is known an electric rotating machine which performs a rotating movement, and is used a direct current (DC) motor, or an alternating current (AC) motor, etc.

The electric rotating machine, such as an AC servo motor, etc., comprises, as shown in FIG. 4, a stator including a stator core 101 and stator coils 102, a rotor 103, a frame 105, and end brackets 106 and 107, etc. The stator is constructed with the stator core 101, which is formed through caulking of laminated layers of stator steel sheets, or through fixing of them by means of laser beam welding, etc., and in gutter portions of this stator core 101 are provided the stator coils 102. The stator steel sheets are formed by punching a belt-like iron or steel sheet, for example, and it is common that the punching shape comprises a main body portion of functioning as a magnetic circuit and end portions, in a part of which are provided the through bolt holes for the purpose of fixing the stator onto the end brackets 106 and 107 thereof.

The rotor 103 has a rotating shaft 104, and is held between the end brackets 106 and 107 through shaft bearings 108 and 109. The shaft bearing 108 is protected by a bearing protection cover 133. The end bracket 106 at a load side has the through bolt holes and outer attachment bolt holes, wherein the stator is fixed by means of the through bolt holes and through bolts, while being fixed to an outside portion by means of the outer attachment bolt holes and outer attachment bolts. And, the shapes of parts which constructs the electric rotating machine are designed to be in the rotational symmetry as far as possible, therefore a circle and/or a square are/is preferable. Also, an outer shape of a flange member gives an effect upon the size of the electric rotating machine, therefore it is so determined to be equal to around an outer shape of a container. Further, there is provided an encoder 110 for performing the detection of position and velocity of the rotor.

In the conventional electric rotating machine, the stator steel sheet has the through bolt holes provided or formed at every corner of the main body thereof, however they are shifted so that the through bolts and the outer attachment bolts do not overlap each other. For example, though the outer shape of the end bracket is nearly in the shape of a square, the stator steel sheets is formed into a nearly rectangular or oblong shape, and the through bolts are provided at the every four corners thereof. Also, it was done that, while forming cutting portions of the square shape at the every four corners of the stator steel sheets, the through bold holes are provided or formed in one side portion of the cutting portion.

However, when forming the stator steel sheets in the rectangular or oblong shape, the rotational symmetry is broken, and therefore the magnetic property thereof is deteriorated. Also, when forming the cutting portions at the ever corners, since the side portion of the cutting portions where no such the through bolt hole is formed does not participate with nor contribute to the magnetic performance, an amount of use of the steel sheets comes up to be more than that being necessary, thereby causing a problem that the stator becomes heavy in the weight thereof. Also, there was caused a problem that the magnetic circuit is deteriorated in the symmetry thereof.

SUMMARY OF THE INVENTION

An object, according to the present invention, for dissolving such the problems in the conventional arts, is to provide an electric rotating machine, with which can be maintained the rotational symmetry of the stator steel sheets, as well as the symmetry of the magnetic circuit, without increasing the weight of the stator.

According to the present invention, there is provided an electric rotating machine comprising: a stator having a stator core being formed by accumulating and fixing a plurality of stator iron or steel sheets, and stator coils; a rotor having a rotation shaft being received within an inner periphery side of said stator; a frame for receiving said stator therein; and end brackets for holding the stator and the rotor therein and having through bolt holes, wherein said stator is fixed to said end brackets by through bolts, and the electric rotating machine is installable onto an outside by means of outer attachment bolts through outer attachment bolt holes which are formed in at least one of said end brackets, and said stator iron or steel sheets are in a shape being symmetric both sides and upside down with respect to an axis of symmetry, each having a main body portion functioning as a magnetic circuit and corner portions, in each of which a through bolt hole is formed, said through bolt holes are provided on said axis of symmetry and on a circumference around the rotation shaft of the rotor at an equal distance therebetween, and further a line connecting between the through bolt hole and the rotation shaft of the rotor is shifted from a line connecting between the outer attachment bolt hole and the rotation shaft of the rotor so that they defined a predetermined angle therebetween.

Also, in the electric rotating machine according to the present invention, wherein said main body portion is in a form, an outer periphery of which is a circle around the rotation shaft of the rotor.

And, in the electric rotating machine according to the present invention, wherein the predetermined angle lies within a range from 100 to 200.

Further, in the electric rotating machine according to the present invention, preferably said predetermined angle is symmetric at both sides of the line connecting between the through bolt hole and the rotation shaft of the rotor as an axis of symmetry.

DESCRIPTION OF PREFERRED EMBODIMENT(S)

Hereinafter, an embodiment(s) according to the present invention will be fully explained by referring to the attached drawings.

An embodiment of an electric rotating machine, according to the present invention, will be explained by referring to FIGS. 1 to 4.

Figure 4:
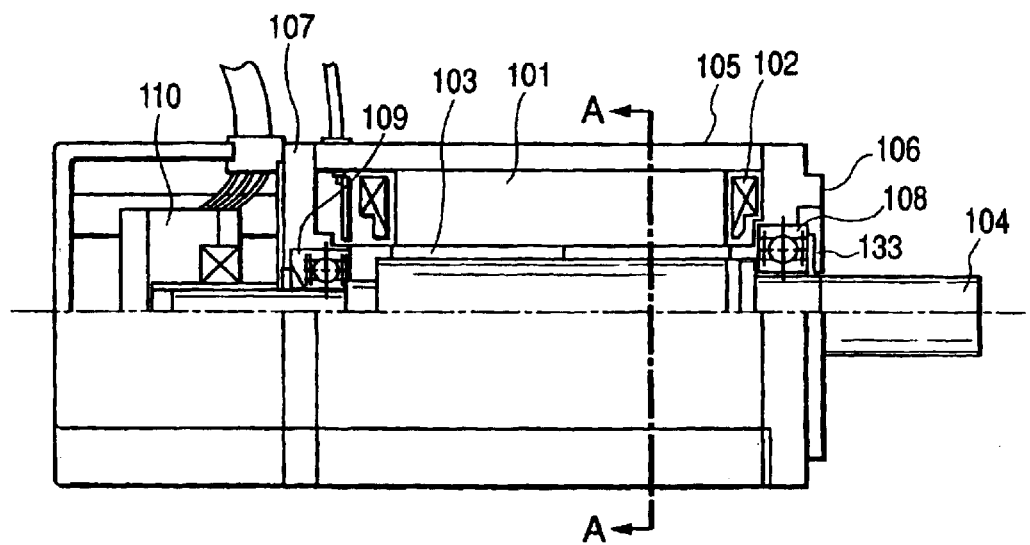
FIG. 4 is a side view for explanation of the electric rotating machine.

The electric rotating machine according to the present invention comprises, as shown in the FIG. 4, a stator including a stator core 101 and stator coils 102, a rotor 103, a frame 105, end brackets 106 and 107, etc. As is shown in the FIG. 1(a) which is the cross-section indicated by arrows A—A in the FIG. 4, the stator is constructed by providing or inserting the stator coils 161 into the gutter portions 16 which are formed on the stator core 101, being formed from the laminated layer of the stator iron or steel sheets 1.

After forming ring members 11 and teeth members 15, respectively, by punching them from, for example, the belt-like iron or steel sheets, each of the stator steel sheets 1 being constructed by inserting the teeth members 15 into the gutter portions of the ring members 11. An example of the teeth member 15 is shown in the FIG. 1(a). The ring member 11 has a main body portion, being in a circle shape around a rotation shaft of the rotor, at the outer periphery thereof, and corner portions 12, each being protruded partially for the purpose of provision of penetrating or through bolt hole 13. Through the main body portion of the ring member 11 is formed the magnetic circuit, therefore, as shown in the FIG. 2, it has a width that is almost constant in the radial direction all round the periphery thereof. And, each of the corner portions 12, as shown in the FIG. 1(b), has an area being at the lowest limit thereof, so that strength can be maintained in the vicinity of the through bolt hole 13. Also, the corner portions 12 are arranged in symmetric on both sides with respect to the lines B1 and B3 connecting between the through bolt holes 13 and the rotation shaft O of the rotor as the axes of symmetry. The rotor 103 has a rotation shaft 104, and is held rotatably onto the brackets 106 and 107 through the shaft bearings 108 and 109. The shaft bearing 108 is held by a bearing holder cover 133. The frame 105 receiving the stator therein is molded so as to form the frame potion 21 therewith, and is connected to the end bracket 106 which has a flange attachment portion 3. The end bracket 106 at the load side comprises, as is shown in the FIGS. 3(a) and 3(b), a flange attachment portion 3 having an outer attachment bolt hole 31 and a through bolt hole 34. And, each of the parts constructing the electric rotating machine is shaped in a circle or a square, so as to obtain the rotational symmetry as far as possible. However, the lines A1–A4 indicate the axes of symmetry in the flange attachment portion 3, and the lines B1–B4 indicate the axes of symmetry in the stator steel sheet 1, and the point O indicates the rotation shaft or the axis of the rotational symmetry. However, since an outer shape of the flange attachment portion 3 of the end bracket 106 gives an influence upon the size of the electric rotating machine, it is determined to be same to the outer shape of the frame. Further, it comprises an encoder 110 for performing detection of position and velocity thereof.

Figure 1A:
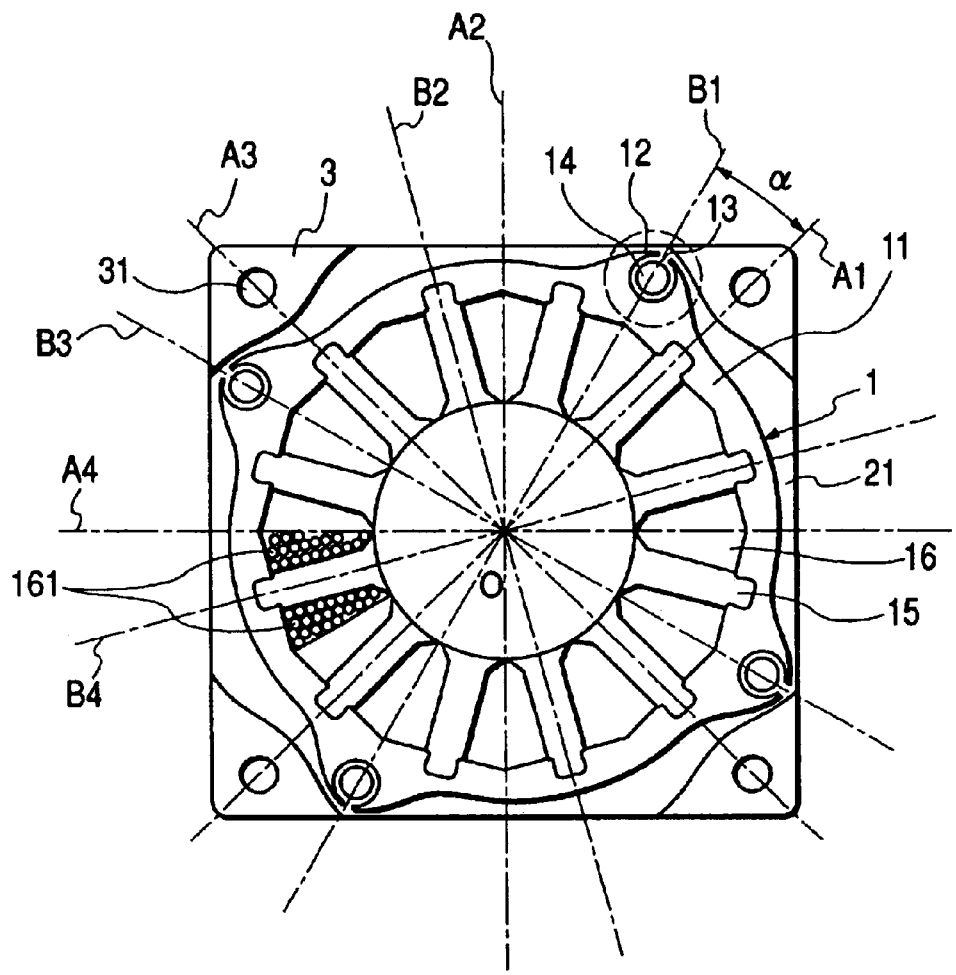
FIGS. 1(a) to (c) are side views for explanation of an electric rotating machine, according to an embodiment.
Figure 1B:
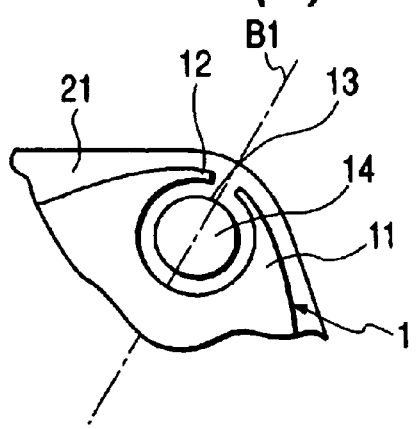
Figure 1C:
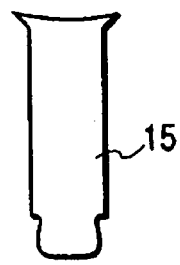
Figure 2:
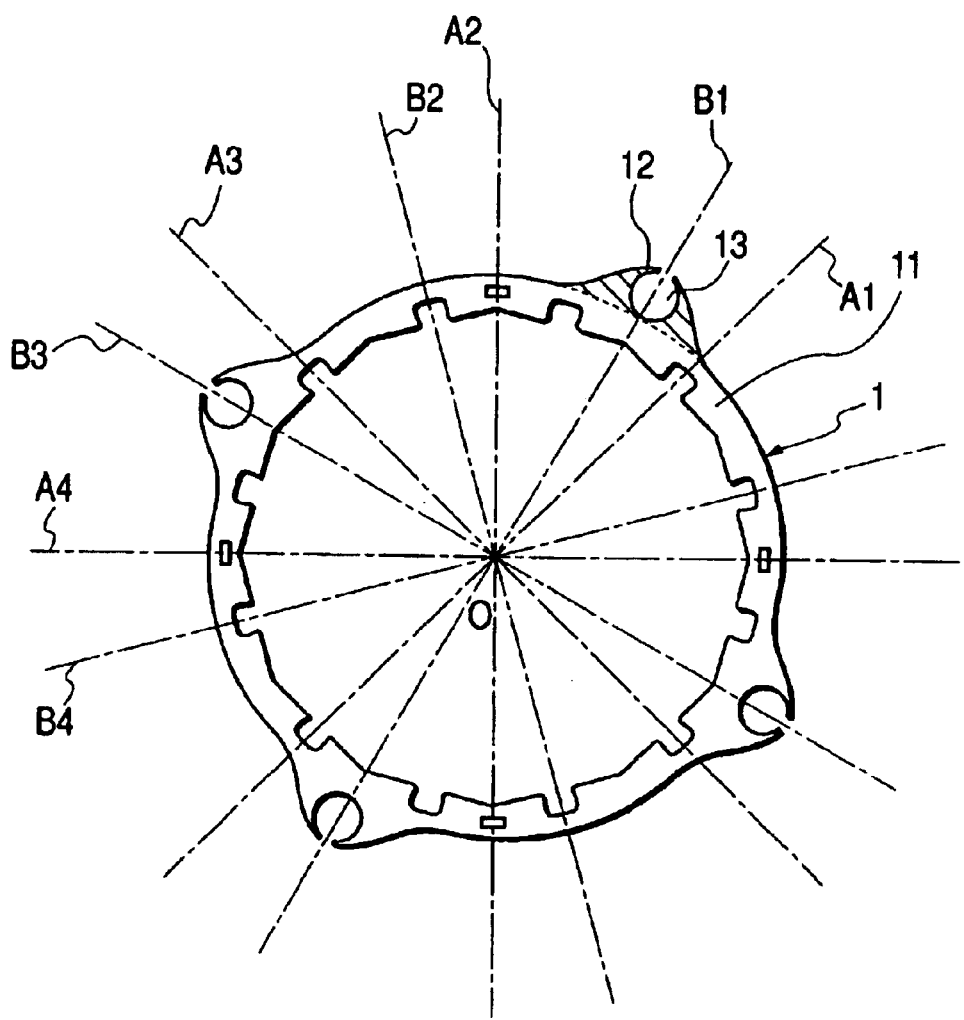
FIG. 2 is an explanatory view of a ring member of the stator iron or steel sheet, which is used in the electric rotating machine, according to the embodiment.
Figure 3A:
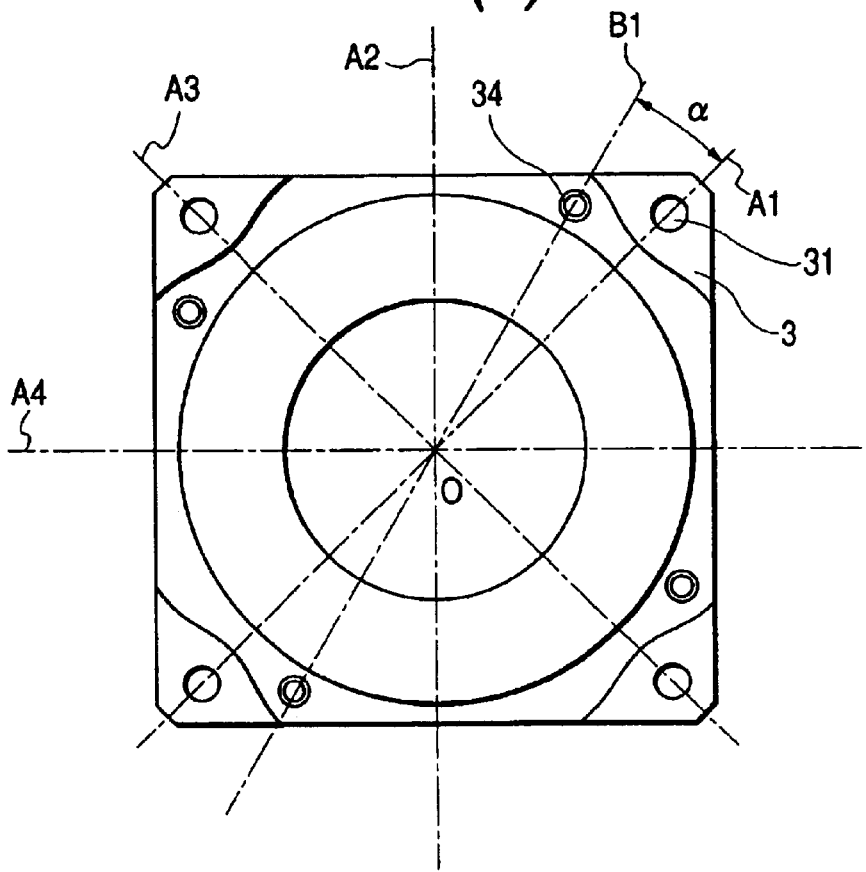
FIGS. 3(a) and (b) are the explanatory views of the end brackets, which is used in the electric rotating machine, according to the embodiment.
Figure 3B:
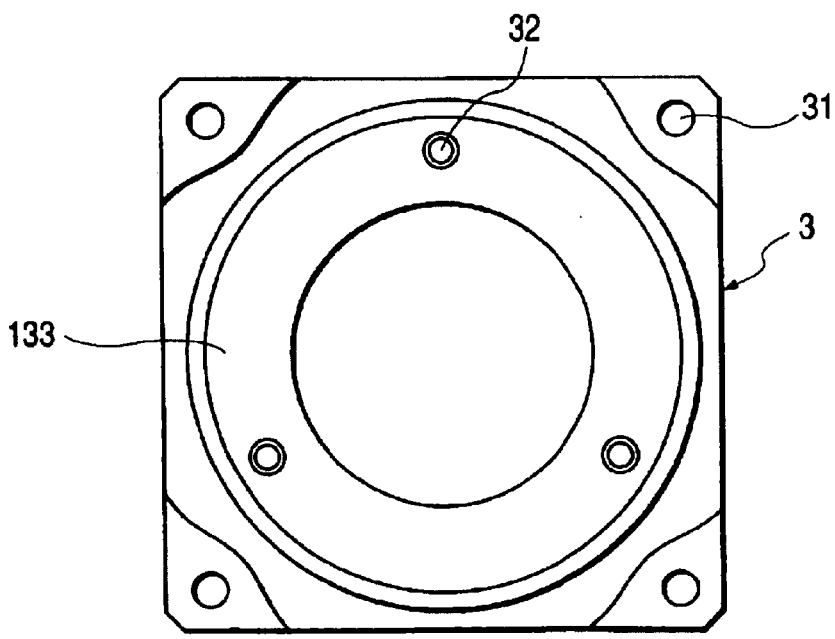

Explanation will be given on the end bracket of the electric rotating machine, according to the embodiment, by referring to the FIGS. 3(a) and 3(b). The FIG. 3(a) is an explanatory view of the end bracket seeing from the stator side, and the FIG. 3(b) is the explanatory view of that from the output shaft side thereof. The end bracket 106 has the outer attachment bolt hole 31, the through bolt hole 34 and an attachment hole 32 for the shaft bearing holder cover. By means of the outer attachment bolts (not shown in the figures) which will be inserted into the outer attachment bolt holes 31, the electric rotating machine is attached or installed onto an outside. Also, by means of the through bolts 14 to be inserted into the through bolt holes 34, the stator which is received within the frame 105 is attached onto the end brackets 106 and 107. The outer shape of the end bracket 106 or 107 is about a square, and is in symmetrical upside down and on both sides with respect to the axes A1–A4 of symmetry. Each of the axes A1–A4 of symmetry defines an angle of 45° in the mechanical angle with respect to the adjacent one thereof. And, the outer attachment bolt holes 31 are formed on the axes A1 or A3 of symmetry.

Further, the B1–B4 are the axes of symmetry in the stator iron or steel sheet 1, and explanation will be given on the stator steel sheet and the axes of symmetry in the embodiment, in more detail thereof. The ring member 11 of the stator iron or steel sheet has, as shown in the FIG. 2, at least a corner portion(s) (a hatched portion) 12 and the through bolt hole 13, and it is symmetric upside down and on both sides with respect to the axes B1–B4 of symmetry, and is also in the rotational symmetry around the point O. Each of the axes B1–B4 of symmetry defines an angle of 45° in the mechanical angle with respect to the adjacent one thereof.

The outer attachment bolt holes 31 are formed on the axes A1 or A3 of symmetry. And, the line connecting between the through bolt holes 13 or 34 and the point O (i.e., the axis B1 or B3) is shifted from the line connecting between the outer attachment bolt holes 31 and the point O (i.e., the axis A1 or A3) by a predetermined angle (, for example, 10°–20°. If it is less than 10°, the positions of the through bolt 13 or 34 and the outer attachment bolt hole 31 overlap each other, then there is a difficulty in the work of installing the electric rotating machine by use of the outer attachment bolts. Also, if it exceeds 20°, the position of the through bolt hole 13 protrudes outside from the outer shape of the bracket so that the size of the electric is rotating machine comes to be large, therefore it is not preferable.

In relation with the stator steel sheets used in the embodiment, though the explanation was given only on the example being consisted of two (2) kinds of the members, such as the ring member and the teeth member, however it may be consisted of only one (1) or alternatively of three (3) or more kinds thereof in stead thereof, and it is also possible to obtain the same effect as that mentioned above. Also, the explanation was given only on the example, where the stator steel sheet is in the shape of square and has the four (4) through bolt holes, however it may be in a shape other than that, but being in the rotational symmetry, or be in a figure other than that. And, with the symmetry and/or the sizes of the stator steel sheet, etc., they/it may shift or be shifted a little bit, by taking the manufacturing errors and accuracy into the consideration.

As is fully explained in the above, in the electric rotating machine, according to the present invention, it is possible to restrict the portions which gives no contribution to the magnetic characteristics thereof only to the corner portions where are formed the through bolt holes, thereby maintaining the rotational symmetry of the stator iron or steel sheet but without increase of the weight of the stator. Namely, though in the conventional art are used the stator steel sheets having the sizes being about same to those of the outer shape of the frame, however according to the present embodiment, the outer shape of the frame and the outer shape of the stator are different from each other, so that the sizes of the stator steel sheets comes to be smaller, therefore it is possible to replace the portions, by which the stator steel sheet comes to be smaller, with a material having a light specific gravity, such as resin (2.0×103 Kg/m$^2$ or so), thereby lightening the weight of the electric rotating machine greatly.

According to the present invention, it is possible to obtain the electric rotating machine without increasing the weight of the stator, while maintaining the rotational symmetry of the stator steel sheets and the symmetry of the magnetic circuit thereof.

What is claimed is:

1. An electric rotating machine comprising:

a stator including a stator core formed by accumulating and fixing a plurality of stator steel sheets, and stator coils mounted onto said stator core;

a rotor having a rotation shaft received within an inner peripheral side of said stator;

a frame for receiving said stator therein; and a pair of end brackets for rotatably holding said rotation shaft of said rotor via bearings, a respective end bracket of said pair of end brackets being fixed on opposite ends of said stator by through bolts inserted into through bolt holes formed therein, and each of said end brackets having a plurality of two kinds of bolt holes;

wherein each of said stator steel sheets forming said stator core functions as a magnetic circuit, and corner portions thereof are formed with bolt holes in a semi-circular shape with an opening portion for receiving the through bolts therein; and wherein said frame is a molded frame of resin.

2. An electric rotating machine as defined in claim 1, wherein each of said stator steel sheets constructing said stator core has a substantially constant width in a radial direction over an entire periphery thereof so as to function as the magnetic circuit.

3. An electric rotating machine as defined in claim 1, wherein each of said semi-circular shaped bolt holes has the opening portion, formed in a radial direction from said rotating shaft.

4. An electric rotating machine as defined in claim 1, wherein each of said corner portions is shaped with a curved outline on a periphery thereof.

\* \* \* \* \*